R. H. COX.
FLY TRAP.
APPLICATION FILED JAN. 13, 1913. RENEWED APR. 20, 1915.
1,141,039.
Patented May 25, 1915.
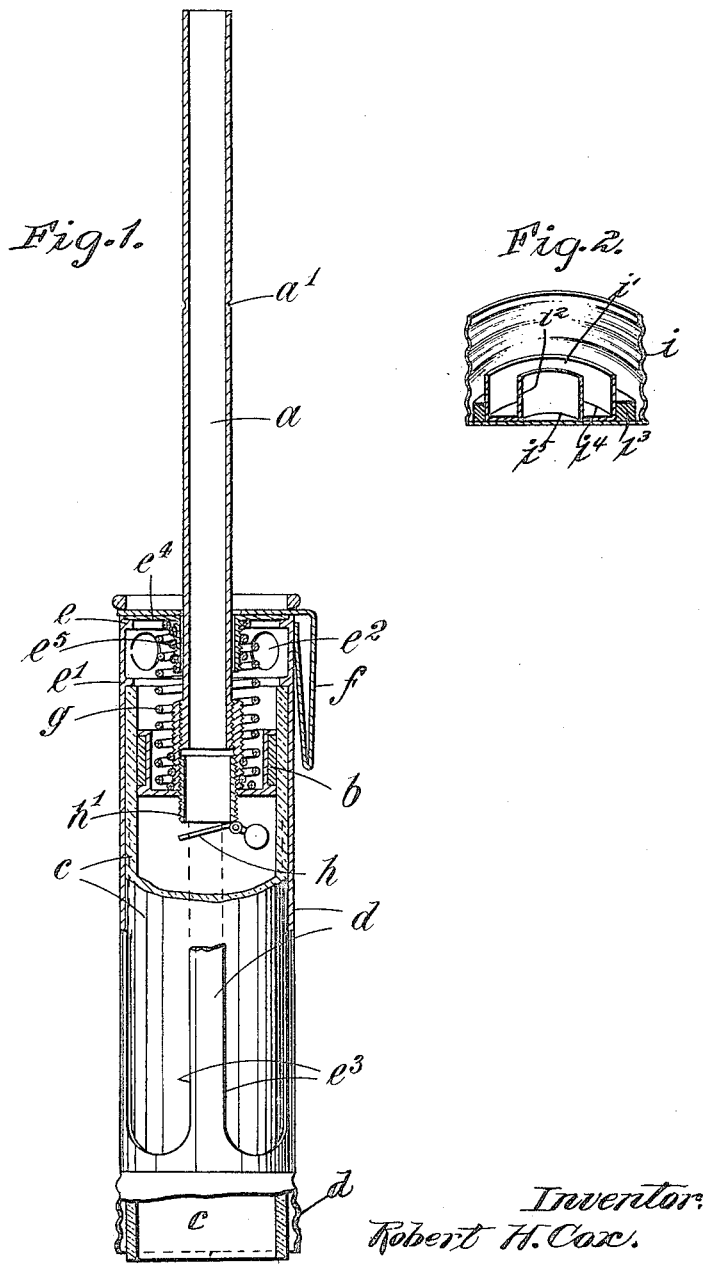

UNITED STATES PATENT OFFICE.

ROBERT HANHAM COX, OF LISTOWEL, IRELAND.

FLY-TRAP.

1,141,039. Specification of Letters Patent. Patented May 25, 1915.

Application filed January 13, 1913, Serial No. 741,859. Renewed April 20, 1915. Serial No. 22,715.

*To all whom it may concern:*

Be it known that I, ROBERT HANHAM COX, a subject of His Majesty the King of England, residing at Listowel, in the county of Kerry, Ireland, have invented a certain new and useful Improved Fly-Trap, of which the following is a specification.

The invention relates to a new or improved fly-trap, instrument, or weapon, for the capture and destruction of flies and other insects; it being a well known fact that flies are capable of communicating various diseases to man and that their destruction or partial destruction would be a benefit to mankind. This invention also relates to the accomplishment of this object in a humane, cleanly and speedy manner.

In carrying my invention into effect I employ the following chief parts:—1. A tube or pipe large enough to permit the easy passage through it of the fly or other insect to be caught and capable of sudden approach (as regards its outer end) to the object aimed at, on the release of a spring. 2. A chamber, attached to the above tube, for the reception and killing of the captured flies or insects and for the production of an inward or suction current of air through the tube, of a strength sufficient to carry the fly or insect into the chamber, by the sudden expanding in size of the chamber on releasing a spring.

The following is a minute description of the different parts of an instrument constructed according to my invention and of a size suitable for capturing the ordinary house fly. For larger insects the parts should be increased in proportion.

In the drawings: Figure 1 is a side elevation of my invention partly in section. Fig. 2 is a perspective view of the cap partly in section.

The reference letters refer to the accompanying drawing which shows the device in sectional elevation.

The device comprises as shown a suction tube $a$ of light weight, made of metal, wood, vulcanite, glass, celluloid or the like; it preferably has a length of about five and three-quarter inches and an internal diameter of about three-tenths of an inch. One end is furnished, for about half an inch up, with a screw thread raised above the external surface of the tube. About three and a half inches up from this end the tube has a narrow groove $a'$ completely around it, which encroaches little, if any, on the bore of the tube. In conjunction with the said tube I provide a piston or plunger $b$ with packing, it is preferably about one and one-tenth of an inch in diameter and has a friction surface of about half an inch deep. The body is hollowed out from one end, leaving only a thin disk and a central tube. This central tube, which is about three-quarters of an inch long, has a thread cut through its whole length of a size to receive the threaded end of the suction tube $a$; while on its outer free end a thread is also cut or laid on to receive one end of the main-spring $g$ hereinafter described.

Surrounding one end of the tube $a$ and the piston $b$ is a cylinder $c$ of glass, about four and a half inches long and with an internal diameter of about one and one-tenth of an inch (or of a size to nicely fit the piston with packing). On the said cylinder $c$ I provide a frame $d$ of metal, wood, vulcanite, celluloid or the like. In shape it resembles a cylinder about five and a quarter inches long, with an internal diameter of about one and three-tenths of an inch (or sufficient to receive the glass cylinder $c$). One end is strengthened by external thickening. Two constrictions or rings $e$ and $e'$ projecting slightly (less than the thickness of the wall of the glass cylinder) are fixed completely around the inner surface of the frame $d$, the one $e$ about two-tenths and the other $e'$ about seven-tenths of an inch from the strengthened end. Immediately above the first constriction $e$ are cut two slots through the frame $d$ which are equal and opposite to each other, and of a size to allow of the easy passage across the frame of a thumb trigger $f$ hereinafter described. Between the two said constrictions $e$ $e'$ four vent-holes $e^2$ are cut, at equal distances from each other, through the frame $d$. Four windows $e^3$ are also cut through the frame, at equal distances from each other, and extending from about two and a quarter inches from the strengthened end of the frame to about four and a half inches. A raised thread is formed on the remaining end of the frame for about half an inch.

Within the end of the frame $d$ I provide a fixed disk $e^4$ of a size to fit into the frame and rest firmly on the first constriction $e$ and just below the slots. Through an aperture in its center is fixed a tube $e^5$ about half an inch long and of internal diameter to allow of the easy passage of either end of the suction tube $a$. On its outer free end a thread is cut or laid on for the attachment of the other end of the main-spring $g$.

The before referred to thumb trigger $f$ is a piece of metal sheet about four inches long; being about an inch wide for the first inch and a half, which part has a circular aperture in its center, large enough to allow either end of the suction tube to easily pass through. The remaining part of the trigger tapers off to a breadth of about a quarter of an inch at the end. At the junction of the parallel portion with the tapering part the sheet is bent to a right-angle and the tapering part near its middle is also bent till it nearly folds on itself, so that when the parallel parts is passed through the slots of the frame the tapering part forms a pressing place for the thumb and a spring against the side of the frame $d$ for the trigger.

The main-spring $g$ is a closed spiral wire spring, of about twelve rounds (or sufficient to give an extension of about three inches), with an external diameter of about seven-eighths of an inch (or of a size to fit into the hollowed out piston): continued at each end into a secondary spiral of three or four rounds, which enter and proceed about a third of an inch through the center of each open end of the large spiral, and of a size and degree of openness to allow of one being screwed on to the threaded tube $e^5$ of the disk $e^4$ and the other on to the threaded tube of the piston $b$.

I provide at the free end of the suction tube a trap-door or valve $h$ which consists of a metal tube $h'$ about half an inch long; of a size to easily allow the passage of the free end of the suction tube through it but not the threaded end. The tube $h'$ is threaded at one end to screw into the tube of the piston $b$ and it is provided with a hinged door $h$ at the other end. This door has a weighted arm $h^2$ projecting beyond the hinge, at an angle somewhat less than two right-angles with the outer plane of the door, and of such a length as permits of the complete opening and shutting of the door without any contact between the weighted arm and the glass cylinder when in position.

At the end of the frame $d$ I provide a cap $i$ preferably in the form of a cup and adapted to have threaded fit with the threaded end of the frame. The cap $i$ carries two annular rings $i'$ and $i^2$ which in coöperation with each other and with the inner wall of the cap $i$ form three compartments $i^3$, $i^4$, and $i^5$. An india rubber or other packing ring $i^6$ is fitted in the outer compartment $i^3$ which is adapted to contact with the slightly projecting end of the glass cylinder when the cap $i$ is screwed on the frame thereby sealing the bottom of the captive chamber.

The inner compartment $i^5$ is designed to contain the insecticide used in the device while the central compartment $i^4$ is designed for the reception of the free end of the suction tube $a$ when the device is out of use.

The parts above described are joined together in the following manner:—The main-spring $g$ is screwed to the disk $e^4$ at one end and to the piston $b$ at the other end. The trap-door $h$ is screwed into the flat end of the piston. These parts are then passed through the strengthened end of the frame $d$ till the disk rests on the first constriction. The thumb-trigger $f$ is then passed through the slots of the frame on to the outer side of the disk, which it thus fixes in position, and the parts are so adjusted that the weighted arm of the trap door and the tapered part of the trigger are near each other. The threaded end of the suction tube $a$ is then passed through the holes of the trigger and disk, through the mainspring and screwed into the tube of the piston. The glass cylinder $c$ is then passed through the threaded end of the frame, over the piston with its packing, till it reaches the lower constriction of the frame. The cap $i$, with its rubber ring and charge of insecticide is then screwed to the frame, when the instrument is ready for use.

The method of using the instrument is as follows:—Press the suction tube into the body of the instrument till the thumb-trigger $f$ engages in the annular groove $a'$ of the suction tube $a$ and remains held there. During the performance of this action the piston $b$ is seen (through the windows of the frame) to move down to the lower end of the cylinder $c$, the mainspring $g$ to be in an extended condition, and the captive chamber (below the piston) very much reduced in size. Now, if the thumb-trigger $f$ be pressed it releases the suction tube $a$ which suddenly shoots forward two or more inches together with the piston $b$ attached. This sudden movement of the piston drives the air in the cylinder above it through the vent holes of the frame and causes a partial vacuum in the suddenly enlarged captive chamber below the piston. To fill this vacuum the air rushes through the suction tube $a$, it being the only inlet to the captive chamber. This inward rush of air through the suction tube is to a certain extent regulated by the weighted arm of the trap-door $h$, in that the passage of air is delayed to some extent till toward the end of the movement of the piston by the resistance afforded in overcoming the inertia of the weight. At the end of the movement of the suction tube and piston the momentum gained by the weighted arm causes the trap-door to open to its full extent and thus allows the inrush of air in the tube $a$ to pass into the captive chamber without any further resistance. When the inrush of air ceases the weighted arm causes the trap-door to close by gravity and to remain closed so long as the fore part of the instrument is not depressed.

Flies may be quickly caught in the following way:—Set the instrument by pressing in the suction tube *a*, then grasp the instrument in the hand with the thumb resting lightly on the trigger *f*. Approach the fly to be caught with the end of the suction tube *a* pointing directly at it till the distance between is about two inches and forming as small an angle as possible between the surface on which the fly rests and the suction tube. Then press the trigger *f*, when the suction tube *a* will shoot out to and beyond where the fly was. If the aim be true the fly is carried through the suction tube *a* and trap-door *h* into the captive chamber, where it may be seen through the windows, lively at first till overcome by the insecticide. As soon as one is caught the pressing in of the suction tube prepares the instrument for the next. The dead bodies of flies thus caught can be removed for destruction by unscrewing the cap *i*. When the instrument is not required for immediate use the suction tube *a* can be unscrewed from the piston *b*, taken out and re-inserted in the reversed position till the end rests in the central compartment of the cap; thus reducing the size of the instrument and facilitating packing and transport.

What I claim as my invention and desire to secure by Letters Patent of the United States is:—

1. An insect trap comprising a transparent chamber provided with an insecticide compartment, a hollow spring controlled piston slidable in the chamber, an open-ended hollow suction tube operatively connected to said piston and releasable means having operative connection with the tube to hold the same and the piston inwardly of the chamber and upon release of said releasable means effecting projection of the tube which creates a suction capable of drawing insects through the tube and the piston into the chamber.

2. An insect trap comprising a chamber provided with an insecticide compartment, a hollow spring controlled piston slidable in the chamber, a suction tube having operative connection with the piston and provided with an external annular groove, and releasable means having operative engagement in the groove of the tube to hold the same and the piston inwardly of the chamber and upon release of said releasable means from said groove effecting a projection of the tube which creates a suction capable of drawing insects through the tube into the chamber.

3. A fly-trap for the capture and destruction of flies and like insects comprising in combination, a cylinder forming an expansile chamber, a tube or pipe slidably arranged in said cylinder, a piston on said tube working in said cylinder a spring tending to keep the tube projected from said chamber, means for retaining the said tube retracted within the said cylinder and the spring compressed, and means for releasing said spring controlled piston and tube for the purpose of causing the tube to rapidly approach the object aimed at and to cause a sudden inrush of air up said tube into the cylinder or chamber for the purpose described.

4. A fly-trap for the capture and destruction of flies and like insects comprising in combination, a cylinder forming an expansile chamber, a tube or pipe slidably arranged in said cylinder, a piston on said tube working in said cylinder, a spring tending to keep the tube projected from said chamber, means for retaining the said tube retracted within the said cylinder and the spring compressed means for releasing said spring controlling piston and tube for the purpose of causing the tube to rapidly approach the object aimed at and to cause a sudden inrush of air up said tube into the cylinder or chamber, and a non-return valve at the inner end of said tube substantially as described.

5. An insect trap comprising a chamber, a spring controlled suction means slidable in the chamber, an open-ended suction tube having operative connection with said suction means, means for releasably fastening the tube and suction means in their innermost position with relation to the chamber so that when the fastening means is released the tube may be projected quickly and, upon projection, create a suction in the chamber to draw air and insects through the tube into the chamber.

6. An insect trap comprising a chamber, a spring controlled suction means slidable in the chamber, an open-ended suction tube having operative connection with said suction means, means for releasably fastening the tube and suction means in their innermost position with relation to the chamber so that when the fastening means is released the tube may be projected quickly and, upon projection, create a suction in the chamber to draw air and insects through the tube into the chamber, and means to prevent exit of insects from the chamber.

7. An insect trap comprising a chamber, a spring controlled suction device slidably mounted in the chamber and including a hollow piston and an open-ended suction tube and means for releasably fastening the suction device in one position so that when the fastening means is released the tube may be projected quickly and, upon projection, create a suction in the chamber to draw air and insects entirely through the tube and into the chamber.

8. An insect trap comprising a chamber, a spring controlled suction device slidably mounted in the chamber and including a hollow piston and an open-ended suction tube, and means for releasably fastening the suction device in one position so that when the fastening means is released the tube may be projected quickly and, upon projection, create a suction in the chamber to draw air and insects entirely through the tube and into the chamber, and means carried by the suction device to prevent exit of insects from the chamber.

9. An insect trap comprising a chamber for the collection of insects and a spring controlled suction device including a hollow open-ended suction tube operable to aim at and approach the insect and upon approaching the insect create a suction which draws the insect into the chamber.

10. An insect trap comprising a chamber provided with an insecticide compartment, a hollow spring controlled piston slidable in the chamber, a suction tube having operative connection with the piston, and releasable means having operative connection with the tube to hold the same and the piston inwardly of the chamber and upon release of said releasable means effecting projection of the tube which creates a suction capable of drawing insects through the tube and the piston into the chamber for confinement therein.

11. An insect trap comprising a chamber provided with an insecticide compartment, a hollow spring controlled piston slidable in the chamber, a suction tube having operative connection with the piston, and releasable means having operative connection with the tube to hold the same and the piston inwardly of the chamber and upon release of said releasable means effecting projection of the tube which creates a suction capable of drawing insects through the tube and the piston into the chamber for confinement therein, and a weighted closure member arranged in the path of suction operable to permit suction and to prevent escape of insects drawn through the suction tube into the chamber.

In testimony whereof I have signed this specification in the presence of two subscribing witnesses.

ROBERT HANHAM COX.

Witnesses:
PHILIP J. FOX,
DAVID C. GLENN.

Copies of this patent may be obtained for five cents each, by addressing the "Commissioner of Patents, Washington, D. C."